Patented Sept. 12, 1933

1,926,094

UNITED STATES PATENT OFFICE 1,926,094

PROCESS OF MANUFACTURING HIGHLY REFRACTORY PRODUCTS

Victor Moritz Goldschmidt, Gottingen, and Karl Siedentopf, Frankfort-on-the-Main, Germany, assignors to Metallgesellschaft Aktiengesellschaft, Frankfort-on-the-Main, Germany, a corporation of Germany No Drawing. Application July 8, 1931, Serial No. 549,562, and in Germany August 6, 1930

22 Claims. (Cl. 25—156)

According to prior processes of the applicants, natural products, such as olivine, peridotite and dunite, containing iron and rich in magnesium orthosilicate, may be worked up into highly refractory products by heating pulverized olivine in admixture with substances rich in magnesium, such as magnesium oxide, magnesite and the like, or with substances capable of forming magnesium oxide, to high temperatures, while avoiding, however, conversion of the mixture into the molten state. The low-melting iron orthosilicate accompanying the olivine is thereby converted into high-melting magnesium ferrite, particularly when working in an oxidizing atmosphere, while at the same time the free or liberated silica is likewise combined in the form of high-melting magnesium orthosilicate. The magnesium hydrosilicates, such as for example serpentine, accompanying the olivine or added magnesium hydrosilicate may likewise be converted into magnesium orthosilicate by the firing process, so that products are obtained consisting essentially of high-melting magnesium orthosilicate and containing, in addition, varying quantities of likewise high-melting magnesium ferrite according to the iron content of the raw materials.

In carrying out these processes it has been found that on drying and more particularly on firing, a more or less considerable contraction occurs, often giving rise to the formation of fissures, whereby the manufacture of products, for example bricks of large size is made exceedingly difficult.

Exhaustive investigations have shown that finely ground magnesium silicates, such as olivine, serpentine and the like, contract considerably on firing. The same applies for finely ground mixtures of the said magnesium silicates with substances rich in magnesium, such as magnesium oxide, magnesite and the like. On the other hand, it has been found that natural products, such as olivine and more particularly olivine of the higher grades of purity, which are rich in magnesium orthosilicate and in granular form, for example in sizes of grain of about 0.5 to 5 mm. are not affected or are not substantially affected in their volume by the firing process.

On the basis of the knowledge of these two facts, it has been found possible to produce constant-volume products of particularly good properties by means of suitably composed mixtures of granular olivine on the one hand, and of finely ground mixtures (fine flour) of olivine or the like or of mixtures of olivine and serpentine with substances rich in magnesium, such as magnesium oxide, magnesite and the like on the other.

The mixtures are preferably so compsed that the constant-volume granular material forms to some extent a coherent framework which on firing protects the mass or the moulded bodies from troublesome changes in volume.

As granular material, olivine of high grades of purity are used containing only comparatively small quantities of iron orthosilicate and magnesium hydrosilicates, such as serpentine and the like. In general, the content of hydrosilicates, such as serpentine, in the granular material should not exceed 10% and preferably should be less than 5%. Likewise, the iron content of the granular material should not exceed 10% (calculated as FeO) and preferably amounts to say 3 to 5%. In many cases, it has been found preferable first to subject the coarsely granular material by itself to a drying process or firing process. Excellent results are obtained by the use or joint use of coarsely granular material which has been recovered from previously fired material, for example, from the waste products of the firing process of the normal manufacture. Also sharp-edged grains, such as may be obtained for example by the comminution of previously fired material, have been found to be well adapted, particularly for the manufacture of stamped bodies or cast bodies from mixtures of coarsely granular material and finely ground material. In this connection, sharp-edged granular material or broken stone, such as is obtained from raw or fired olivine rocks, may be added in a manner similar to that of adding fine or coarse gravel or broken stone to concrete. Here, the sizes of grain of 0.5 to 5 mm. mentioned in the foregoing may be considerably exceeded. Moreover, the size of grain should be adapted to the nature of the materials to be worked up, and the dimensions of the pieces to be manufactured, that is, to the working process and the intended use. For the manufacture of normal bricks, employing high-pressure compression, sizes of grain of 0.2 to 2.5 mm. have proved suitable and sizes of grain of, for example, 1 to 5 mm. for the manufacture of large moulded pieces and for working with low pressure. Of course, other mixtures of different particle sizes may be employed, more particularly such as give the most compact filling of the space.

Impure olivines, for example such as contain rather large quantities of magnesium hydrosilicates and/or iron silicate, may be used to advantage for making the finely ground material.

Thus, for example, the iron content of the mixture in powder form of olivine and substances rich in magnesium may amount to from 3 to about 14% (calculated as FeO). Likewise, magnesium hydrosilicates, more particularly serpentine, may be added separately to the finely ground material. The fine material may also be first subjected to a drying or de-hydration process, more particularly when the said fine material contains large quantities of magnesium hydrosilicate.

The advantages attainable by the invention will be seen from the following comparative experiments.

(1) Olivine was ground with the addition of sufficient quantities of magnesite for converting the iron orthosilicate into magnesium ferrite and for converting the magnesium hydrosilicate present into magnesium orthosilicate. The resulting finely ground material was moulded into bricks by means of compression under high pressure using small quantities of moisture. The bricks obtained suffered, on firing, linear contraction of 10–15%.

(2) The same kind of finely ground material (as in Experiment 1) was mixed with granular olivine in the proportions of 60% of finely ground material and 40% of granular material. The bricks made therefrom suffered, on firing, linear contractions of only 1–2%.

(3) The finely ground material referred to in Experiment 1 was mixed in the proportion of 40% of the same with 60% of granular olivine. The bricks made therefrom remained, on firing, practically constant in volume.

In practice, the contraction on firing makes itself felt in a particular unpleasant degree when firing is effected under pressure, such as exists, for example, in the lower portions of the, say, 2 metre high piles in the firing chambers. If 70% of granular olivine is mixed with 30% of the finely ground material of Experiment 1, the products remain constant in volume even under the load pressures involved in the method of piling employed in ceramic firing kilns, and likewise also under the pressures occurring on the occasion of the use of the products in furnace practice.

The quantitative proportions will depend upon the nature and quality of the raw materials, the working conditions, the size of the pieces to be made, the intended purpose, etc. In using compression under high pressure, at least 30–40% of coarsely granular material will in general be necessary for the formation of a practically spatially constant skeleton. In hand moulding, it is generally advisable to use more of the coarsely granular material, for example, not less than 50%. If desired, the coarsely granular material may be more or less embedded in the finely ground material. Products manufactured in this way, however, are somewhat inferior, in regard to constancy of volume, to the moulded articles which are provided with a coherent framework of coarsely granular material. In certain circumstances, however, they make a firmer bond. On the other hand, in certain cases, the amount of coarsely granular material in the mixture may also be made very high, for example, up to 80% or 90% of the total quantity.

In working up mixtures consisting mainly of coarsely granular material, for example, such mixtures as contain 70% or more coarsely granular material and only 30% or less finely ground material, great care must be paid to the preparation of the masses, so as to obtain a good bond. For example, it has been found very important to take care that the moisture is uniformly distributed in the mass, and it is also important that the manufacture of the finely ground material from, for example, olivine and magnesite, should be done under conditions ensuring intimate and uniform mixing of the components, for example by grinding the components together.

In the manufacture of the finely ground material, grinding will be carried down to a degree of fineness at which, on sieving through a 4,900 mesh sieve, not more than 5% remains on the sieve. The quantitative relations between magnesium silicates and the substances rich in magnesium, such as magnesium oxide, magnesite and the like, should be so proportioned that the magnesium oxide is sufficient to convert the heavy metal orthosilicates more particularly iron orthosilicate, present in the finely ground material, as well as other compounds of the heavy metals, as for example metasilicates, oxides and hydroxides, into compounds of the nature of magnesium ferrite and sufficient also to combine with free or liberated silicate by converting it into magnesium orthosilicate. If magnesium hydrosilicates are present in the finely ground material, the addition of magnesite is so proportioned that the said magnesium hydrosilicates can be converted into magnesium orthosilicate. The magnesite content of the finely ground material may also be made somewhat higher, for example, such that, apart from the finely ground material, the olivine present in finely granular form can also take part in the reactions, and if desired, such that the olivine material present in coarsely granular or lump form can also react superficially with the magnesite.

In carrying out the process, for example, the coarsely granular material alone is first moistened with water or other suitable liquid, for example, a suspension of magnesite in water or preferably in a solution of magnesium chloride, calcium chloride or the like, the finely ground material being added afterwards. The coarsely granular material absorbs the added water, while there takes place, on the surface of the individual grains, which are to be mixed with finely ground material or other grains or both, a concentration of magnesium oxide or the formation of a kind of Sorel cement, which is very important for cold consolidation. The surface of the coarse grains may also be subjected to chemical or physical disintegration by previous treatment with, for example, dilute alkaline solutions, for example soda solution, or dilute acids, for example aqueous hydrochloric acid, which disintegration renders the grains particularly suitable for the desired cementing with finely ground material or with other grains. Chemicals having such action may also be added to the moistening liquid consisting for example of magnesium chloride solution and magnesite. It has been found advantageous to employ aqueous solutions of boric acid or borates, such as for example alkali borates, as liquid additions to the raw materials.

To the coarsely granular material, after pretreatment with liquids or suspensions of the kind stated, is then added the finely ground material, consisting, for example, of olivine and caustically fired magnesite. The finely ground material may first be worked up with the remaining quantity of moistening liquid and may then be added to the coarsely granular material.

In general, however, it has been found to be more advantageous to add the finely ground material in a dry state to the coarsely granular material which has been preliminarily treated with part of the liquid, and to incorporate the remaining quantity of liquid in the mixture with as uniform a dispersion as possible. The dry, finely ground material thereby settles round the moist coarse grains. In the presence of a sufficient quantity of granular material, the corners and edges of the individual grains, during compression or moulding, press through the finely ground mass until they make contact with one another, the finely ground material completely filling up the interstices between the individual grains and at the same time coming into intimate contact with the prepared surfaces of the coarse grains.

It has been found advantageous to limit extensively the quantity of liquid to be added to the material. The addition of liquid depends upon the mixture of materials worked up, and more particularly upon the proportion of finely ground material to coarsely granular material. When large quantities of coarsely granular material are used, less liquid is necessary than when there is less granular material in the mixture. With compression under high pressure, additions of liquid of, for example 3–7% have been found preferable, and with low pressure moulding, additions of liquid between 5 and 15% have been found preferable. It is possible, for example, to proceed in such a way that about ⅕ to ⅓ of the quantity of liquid to be used is mixed with the coarsely granular material, after which the finely ground material is added dry, the rest of the liquid being then added in a finely dispersed manner, for example by means of a sprinkler, while thoroughly working up the mass. It has been found preferable to carry out the working process in such a way that the hardening processes between the magnesite and the remaining constituents only take place when the composition has already been moulded into the desired pieces. In general, compact moulding, for example by means of hydraulic compression, compressed air stamping or the like, has proved particularly satisfactory.

The firing of the moulded constructional pieces may proceed in an oxidizing or reducing atmosphere or, with particular advantage, in an alternately oxidizing and reducing atmosphere. If an oxidizing atmosphere is employed, the constructional pieces, after they have been subjected to preliminary drying, are preferably heated, for example during a period of 30 to 50 hours to a temperature of 1400° to 1500° C., and are then left for example at about 1500° C. for about 15 hours, whereupon they are left to cool in the course of about 100 hours. Particularly good results are obtained when heating is carried out, partly for example during a period of 4 hours, at still higher temperatures, that is, say, at temperatures of about 1500° to 1650° C. Temperatures at which melting of the material occurs should be avoided. If it is desired to fire in an alternately oxidizing and reducing atmosphere, for example, the fired material is heated in the course about 30 hours to about 1380° C. and is maintained at this temperature for at least about 1 hour, but preferably for 4 to 6 hours in a reducing atmosphere, and is thereupon allowed to cool to room temperature in the course of a long time, within 15 hours at the earliest, in an oxidizing atmosphere. It should be noted here that, with partial firing in a reducing atmosphere, the firing temperature is lowered and the firing period is shortened, so that, for example, just as good results are obtained when firing is effected in a reducing atmosphere for six hours at about 1380° C. as when it is effected in an oxidizing atmosphere for 12 hours at about 1530°.

The times here stated for the duration of firing apply more particularly when chamber kilns or annular kilns are used. If a tunnel kiln is employed, the duration of firing may be reduced considerably.

The invention permits the manufacture of highly refractory products, for example, of moulded bricks which, on firing, remain constant in shape and may be fired free from fissures while obtaining uniformly good products. One particular advantage consists in the fact that large or, if necessary, very large pieces may be made free from fissures by means of stamping and hydraulic moulding. The raw, unfired moulded pieces are distinguished by their very high powers of resistance and by their remarkable insensitivity to moisture.

Due to this, and also due to their constancy of shape on firing, it is possible to manufacture raw bricks by simply moulding and pressing, and to store or transport the said bricks without running a risk that trouble will be caused by the action of moisture and the like. The raw bricks may then be built together at the place of use and only then need to be subjected to firing, for example by the heating which takes place when the furnace itself is put into operation. Due to the constancy of volume, no trouble is then caused by residual deformation and the formation of fissures. Manufacture is simplified and cheapened by the possibility of producing large constructional pieces. In addition, the building of the furnaces and the like is simplified and the number of joints, which are always detrimental, as well as the quantity of mortar and water required for building, are diminished. Another advantage consists in the saving of considerable quantities of comparatively expensive magnesite particularly in working up mixtures consisting pre-eminently of coarsely granular material. If 40% of coarsely granular material is used, for example, 10% of magnesite is still required, while if 70% of coarsely granular material is used, only 6 to 8% of magnesite is required.

Examples (1) An olivine rock having the composition $SiO_2$ 42%, MgO 50%, $Fe_2O_3$ plus FeO 6.5% (calculated as FeO) and a loss on ignition of 1% is used as raw material. 4.5% of the iron (calculated as FeO) is present in the form of iron orthosilicate and 2% in the form of chromite and magnetite. The rock is comminuted to pieces of a maximum size of 8 mm. with for example, jaw breakers and by means of a spindle or gyratory breaker, and is separated, by screening, into coarsely granular material of 0.5 to 8 mm. and finely granular material. The quantity of coarsely granular material amounts to 60% of the total weight, the remaining 40% being finely granular material. Both fractions contain about 6% of magnesium hydrosilicate. As finely granular material, however, olivine may be used, which is richer in magnesium hydrosilicates, containing, for example, about 15% thereof.

To each 100 kilograms of the finely granular olivine is added about 15 kilograms of caustic magnesite of the following analysis: 92% MgO, 2% FeO, 1% SiO$_2$ and 5 loss on ignition. The mixture is ground in a rod mill to the fineness of cement. 20 kilograms of water in which have been dissolved 2 kilograms of magnesium chloride, are then added to each 600 kilograms of the coarsely granular olivine, and the whole is carefully mixed. To this mixture of coarsely granular olivine and magnesium chloride solution is now added 550 kilograms of finely ground material and both mixtures are carefully dispersed in one another. Thereupon another 30 kilograms of the above mentioned 10% magnesium chloride solution is added and the whole is thoroughly mixed together.

From the resulting material, bricks of a suitable shape are moulded using a pressure of, for example, 500 kilograms per square centimetre and are dried for 24 hours at a temperature of 30° C. Thereupon they are fired, being first brought in the course of 40 hours in an oxidizing atmosphere to a temperature of about 1440° C., whereupon they are fired for another 4 hours in a reducing atmosphere at a temperature of about 1400–1480°. They are then heated again in an oxidizing atmosphere for 8 hours at about 1500° C., and are finally cooled off, also in an oxidizing atmosphere, in the course of 100 hours.

The bricks obtain exhibit, after firing, a linear contraction of less than 1% and are thus practically constant in volume.

(2) An olivine rock having the composition SiO$_2$ 43%, MgO 51%, Fe$_2$O$_3$, plus FeO 5.5% (calculated as FeO) is used and is worked up in a similar manner as in Example 1. The quantity of coarsely granular material amounts in this case to 80% of the weight of the olivine, so that 20% of the olivine is used as finely ground material. The quantity of magnesite added to the finely ground material and also the quantity of water amount to 3% of the total material.

After the coarsely granular material and the finely ground material have been thoroughly mixed together, bricks are moulded from the mixture and these bricks, after a preliminary drying in accordance with that given in Example 1, are heated in the course of about 50 hours in an oxidizing atmosphere to a temperature of about 1430° C. Thereupon, they are kept for about 12 to 15 hours in an oxidizing atmosphere at this temperature and finally for about 4 hours at a temperature of 1500 to 1650° C. The bricks are then allowed to cool for about 100 hours in an oxidizing atmosphere.

The resulting highly refractory products are almost completely constant in volume, even under the high pressures occurring on the occasion of their use in furnaces.

(3) The same material as in Example 2 is heated in the course of about 30 hours in an oxidizing atmosphere to a temperature of 1400–1500° C. and is then kept for 6 hours at a temperature of 1400–1500° C. Thereupon it is cooled in an oxidizing atmosphere, this being effected so slowly that the temperature during the first six hours' cooling only falls to 1300° C. and further cooling until the removal of the bricks takes place in the course of about 30 hours.

I claim:

1. A process of manufacturing highly refractory products which comprises mixing coarse granular natural products rich in magnesium orthosilicate, such as olivine, with a finely ground material consisting of natural products rich in magnesium orthosilicate and of substances rich in magnesium, such as magnesite, and firing said mixture to produce a highly refractory product substantially free from troublesome changes in volume, said firing being conducted by heating to temperatures sufficiently high to effect cohesion of the particles whilst avoiding conversion into a molten state.

2. A process as claimed in claim 1, in which the coarse granular material containing natural products rich in magnesium orthosilicate, such as olivine, is mixed with the finely ground material in such proportions that troublesome volume changes do not occur on firing, the said finely ground material contains magnesium hydrosilicates, such as serpentine.

3. A process as claimed in claim 1, in which the starting mixture contains so much granular material that the latter forms a coherent framework.

4. A process as claimed in claim 1, in which the starting mixture contains at least 40% of granular material.

5. A process as claimed in claim 1, in which the starting mixture contains at least 60% of granular material.

6. A process as claimed in claim 1, in which the finely ground material consists of an intimate mixture of olivine and magnesite.

7. A process as claimed in claim 1, in which the finely ground material consists of an intimate mixture of olivine, magnesium hydrosilicates and magnesite.

8. A process as claimed in claim 1, in which the finely ground material contains so large a quantity of substances rich in magnesium, such as magnesite, as is necessary for converting the iron orthosilicate and other iron compounds present therein into magnesium ferrite, for combining with the silica, and for converting the magnesium hydrosilicate into magnesium orthosilicate.

9. A process as claimed in claim 1, in which the finely ground material contains such a quantity of substances rich in magnesium, such as magnesite, as is necessary for converting the iron orthosilicate and other iron compounds present therein into magnesium ferrite, for combining with the silica and for converting the magnesium hydrosilicates into magnesium orthosilicate, there being in addition still so much magnesite as to suffice also for entering superficially into reaction with the grains present in the mixture.

10. A process as claimed in claim 1, in which the finely ground material is made from olivine rock of a comparatively low grade of purity which contains more magnesium hydrosilicates, iron silicates and other iron compounds than the starting material for producing the coarsely granular material.

11. A process as claimed in claim 1, in which the granular material consists of olivine that does not contain more than 10% of magnesium hydrosilicate and is poor in iron orthosilicate.

12. A process as claimed in claim 1, in which the magnesium silicates to be worked up are dehydrated before making the mixture.

13. A process as claimed in claim 1, in which the granular material to be worked up is dehydrated before making the mixture.

14. A process as claimed in claim 1, in which small quantities of liquid are incorporated with the mixture of granular material and finely ground material which is to be worked up.

15. A process as claimed in claim 1, in which a suspension of magnesite in a suitable liquid is employed for moistening the material.

16. A process as claimed in claim 1, in which a suspension of magnesite in an aqueous solution of a salt is employed for moistening the material.

17. A process as claimed in claim 1, in which a suspension of magnesite in a solution of magnesium chloride is employed for moistening the material.

18. A process as claimed in claim 1, in which first the granular material is treated with a partial quantity of the moistening liquid, whereupon the finely ground material is added and the remaining quantity of liquid is uniformly incorporated in the mass.

19. A process as claimed in claim 1, in which the granular material is disintegrated by preliminary treatment with chemicals.

20. A process as claimed in claim 1, in which the moistened mixture of granular material and finely ground material is subjected to high pressures and is then fired.

21. A process as claimed in claim 1, in which the mixtures of granular material and finely ground material are converted into moulded bodies, the moulded bodies are built together in the unfired state, and only then are consolidated by firing.

22. A process as claimed in claim 1, in which the firing of the mixture, by heating alternately in an oxidizing and reducing atmosphere is shortened and the firing temperatures are lowered.

VICTOR MORITZ GOLDSCHMIDT.
KARL SIEDENTOPF.